(12) United States Patent
Plass

(10) Patent No.: US 11,473,603 B2
(45) Date of Patent: Oct. 18, 2022

(54) METHOD FOR PRODUCING A COMPOSITE COMPONENT

(71) Applicant: Bayerische Motoren Werke Aktiengesellschaft, Munich (DE)

(72) Inventor: Michael Plass, San Luis Potosi (MX)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 247 days.

(21) Appl. No.: 16/872,810

(22) Filed: May 12, 2020

(65) Prior Publication Data

US 2020/0271146 A1    Aug. 27, 2020

Related U.S. Application Data

(63) Continuation of application No. PCT/EP2018/075931, filed on Sep. 25, 2018.

(30) Foreign Application Priority Data

Nov. 16, 2017    (DE) ...................... 10 2017 220 431.1

(51) Int. Cl.
*F16B 5/02* (2006.01)
*F16B 11/00* (2006.01)
*F16B 25/00* (2006.01)
*F16B 25/10* (2006.01)

(52) U.S. Cl.
CPC .............. *F16B 5/02* (2013.01); *F16B 11/006* (2013.01); *F16B 25/0021* (2013.01); *F16B 25/106* (2013.01)

(58) Field of Classification Search
CPC .... B62D 27/026; B21J 5/066; F16B 25/0021; F16B 25/106; F16B 5/02; F16B 11/006
See application file for complete search history.

(56) References Cited

U.S. PATENT DOCUMENTS

| 2,654,284 A | 10/1953 | Schevenell |
| 8,857,040 B2* | 10/2014 | Freis ....................... F16B 35/00 29/525.11 |
| 2015/0275944 A1 | 10/2015 | Duenisch et al. |

(Continued)

FOREIGN PATENT DOCUMENTS

| CN | 104684795 A | 6/2015 |
| DE | 202 06 453 U1 | 9/2002 |
| DE | 10 2012 109 047 B3 | 2/2014 |

(Continued)

OTHER PUBLICATIONS

Chinese-language Office Action issued in Chinese Application No. 201880062181.7 dated Feb. 18, 2021 with English translation (14 pages).

(Continued)

*Primary Examiner* — Moshe Wilensky
(74) *Attorney, Agent, or Firm* — Crowell & Moring LLP

(57) ABSTRACT

A method produces a composite component from a first joining element and a second joining element by use of an adhesive and a flow drill screw. Before attaching the second joining element to the first joining element, a recess is made around the at least one screw position in which the respective flow drill screw penetrates the second joining element, in a joining surface of the second joining element.

13 Claims, 2 Drawing Sheets

(56) References Cited

U.S. PATENT DOCUMENTS

2017/0130751 A1    5/2017   Norton et al.
2017/0313026 A1    11/2017   Huff et al.

FOREIGN PATENT DOCUMENTS

| | | |
|---|---|---|
| DE | 10 2012 222 640 A1 | 6/2014 |
| DE | 10 2014 003 181 A1 | 9/2015 |
| DE | 10 2015 008 719 A1 | 1/2017 |
| DE | 10 2016 121 295 A1 | 5/2017 |
| DE | 10 2017 108 445 A1 | 11/2017 |
| EP | 2 928 760 B1 | 2/2018 |
| EP | 3 388 695 A1 | 10/2018 |

OTHER PUBLICATIONS

International Search Report (PCT/ISA/210) issued in PCT Application No. PCT/EP2018/075931 dated Jan. 8, 2019 with English translation (six (6) pages).

German-language Written Opinion (PCT/ISA/237) issued in PCT Application No. PCT/EP2018/075931 dated Jan. 8, 2019 (six (6) pages).

German-language Search Report issued in German Application No. 102017220431.1 dated Sep. 5, 2018 with partial English translation (12 pages).

\* cited by examiner

METHOD FOR PRODUCING A COMPOSITE COMPONENT

CROSS REFERENCE TO RELATED APPLICATIONS

This application is a continuation of PCT International Application No. PCT/EP2018/075931, filed Sep. 25, 2018, which claims priority under 35 U.S.C. § 119 from German Patent Application No. 10 2017 220 431.1, filed Nov. 16, 2017, the entire disclosures of which are herein expressly incorporated by reference.

BACKGROUND AND SUMMARY OF THE INVENTION

The invention relates to a method for producing a composite component composed of a first and a second joining element by use of an adhesive and at least one flow drill screw.

In the prior art, methods for producing a composite component composed of two joining elements by use of an adhesive and a flow drill screw are already known. These methods usually involve the connection of two flat metal sheets, or one flat metal sheet to another component, as joining elements. The connection of the metal sheets or of the metal sheet to the component is intended to be formed to be as durable as possible by way of the adhesive and the flow drill screw. During the connection of the metal sheets or of the metal sheet to the component by way of the flow drill screw, the latter penetrates at least into one of the joining elements involved and thereby forms a hole and a thread. During the forming of the hole and the thread, material is melted and displaced. In the known methods, the displaced material is at least partially transported between the joining elements. The material between the joining elements allows a gap to form between said elements and deforms at least one of the joining elements in an uncontrolled fashion. The adhesive layer which is arranged between the joining elements and is composed of the adhesive is interrupted by the formation of the gap, such that the adhesive layer, in the region of the gap, has a lower level of adhesion to the joining elements compared with the surrounding regions. As a result, compared with the surrounding regions in which a gap has not formed, the interrupted regions of the adhesive layer can absorb significantly smaller forces before breakage occurs as a result of the lower level of adhesion.

In order to avoid the formation of a gap, it is furthermore known to provide a pilot hole for the flow drill screws, such that a relatively small amount of material has to be displaced and thus a relatively small amount of material is conveyed between the joining elements. However, it is disadvantageous here that a gap still forms, merely to a lesser extent compared with a method without a pilot hole. Furthermore, a further method step is required for producing the pilot holes, which is time-consuming and expensive, since machines that would otherwise not be required for this purpose have to be provided and the joining elements have to be positioned in said machine.

The invention is therefore based on the object of overcoming the abovementioned disadvantages and providing a method for producing a composite component, in which method the adhesive layer, which is formed between a first and a second joining element, has a substantially uniformly high level of adhesion, and the joining elements are not formed in an uncontrolled fashion.

The invention provides a method for producing a composite component. The composite component is composed of a first joining element and a second joining element. The method comprises at least the following steps:

a. applying an adhesive to a joining surface of the first joining element;

b. arranging a joining surface of the second joining element on the joining surface of the first joining element, the adhesive thereby being distributed already between the joining elements and being formed to provide an as yet uncured adhesive layer between the joining elements;

c. fixing the second joining element on the first joining element by screwing in a respective flow drill screw at at least one screw position on the second joining element, the respective flow drill screw being screwed through the second joining element into the first joining element, with simultaneous flow drill screwing of a hole and a thread for the respective flow drill screw into the first joining element.

The method is characterized in that, prior to the fixing of the second joining element on the first joining element, a recess is formed in the joining surface of the second joining element. The recess is formed around the at least one screw position, at which the respective flow drill screw penetrates the second joining element, such that the material which is displaced by the flow drill screw is at least partially accommodated by the recess. By virtue of the recess, a cavity is formed between the first and the second joining element. This cavity is filled with adhesive during the arrangement of the second joining element on the first joining element and the fixing of the second joining element on the first joining element. The material displaced by the flow drill screw during the screwing of the flow drill screw into the first joining element is moved at least partially in the direction of the second joining element. All of the material which is moved out of the first joining element in the direction of the second joining element and which, in a conventional method, would lead to the formation of a gap is accommodated by the cavity between the first and second joining element, such that no gap is formed. If the second joining element does not have a through-bore, such that the flow drill screw also forms a hole and a thread in the second joining element, at least part of the material displaced in the process is likewise transported into the cavity, said cavity being configured to also accommodate the material.

In an advantageous development, the second joining element is a metal sheet and, in particular, an aluminum metal sheet.

Furthermore, the first joining element is advantageously formed of aluminum. The first joining element is also preferably formed as a hollow support, a metal sheet or as a component made of a solid material, which is not completely penetrated by the flow drill screws when the flow drill screws are screwed in.

In an advantageous method, the recess in the metal sheet is produced by way of a non-cutting forming method, in particular a stamping or deep-drawing method. The metal sheet thus forms the recess by way of a pot-shaped formation, the interior space or cavity of which points toward the first joining element. The metal sheet is usually shaped by way of a non-cutting forming method in any case. The forming of the recess by means of a non-cutting forming method can be integrated directly into the existing production process of the first joining element, such that no additional process steps or process times are necessary for this purpose.

In a development of the method, the pot-shaped formation on a surface of the second joining element that faces away from the first joining element forms a supporting surface for a screw head of the respective flow drill screw. The supporting surface has a supporting-surface diameter which is at least the same size as a diameter of the respective screw head. By virtue of the fact that the screw or the screw head rests on the supporting surface by way of a surface provided therefor, forces can be introduced by way of the screw, over a maximum area, into the second joining element, and can be diverted therefrom into the screw.

In an advantageous embodiment, the second joining element, at the at least one screw position, has a respective through-hole. As an alternative, such a through-hole is introduced into the second joining element. The flow drill screw is screwed into the first joining element through the through-hole during the fixing of the second joining element on the first joining element, such that a hole does not have to be formed by way of the flow drill screw and therefore only material which is transported by way of the flow drill screwing in the first joining element into the cavity has to be accommodated in the cavity. Since the cavity or the recess has to accommodate a relatively small amount of material, the recess can be configured to be smaller, as a result of which the visual appearance of the second joining element is influenced to a lesser extent and relatively low degrees of deformation are necessary during the production of the recess.

In order to be able to distribute the material from the flow-drilling process uniformly in the recess, it is advantageous for the recess, in one development, to be of round configuration and to be arranged centered around the respective screw position.

The recess preferably has a diameter of between 10 and 30 mm, measured at the joining surface of the second joining element.

The recess further has a depth of between 0.5 and 2 mm, measured from the joining surface of the second joining element to the deepest point of the recess.

If the second joining element is connected to the first joining element by way of more than one flow drill screw, a flow drill screw is in each case screwed through the second joining element into the first joining element at a screw position. Two screw positions then advantageously have a spacing from one another of between 40 and 100 mm.

An alternative embodiment makes provision for the recesses of two directly adjacent screw positions to be connected to one another. The recesses together form a channel-shaped cavity in the second joining element toward the first joining element.

The invention further provides the use of a stamped metal sheet in a method according to the invention. The metal sheet has a respective pot-shaped formation centered around the at least one screw position, which, at the formation, determines a cavity between the metal sheet and the first joining element. The cavity, which is formed by way of the recess in the second joining element or in the joining surface of the second joining element, between the first joining element and the second joining element is configured to accommodate a material which, in the case of flow drill screwing, is conveyed into the cavity by the flow drill screw during the fixing of the second joining element on the first joining element.

The features disclosed above can be combined as desired, insofar as this is technically possible and they are not mutually exclusive.

Other objects, advantages and novel features of the present invention will become apparent from the following detailed description of one or more preferred embodiments when considered in conjunction with the accompanying drawings.

The figures are by way of example and schematic. Identical reference designations in the figures indicate identical functional and/or structural features.

DETAILED DESCRIPTION OF THE DRAWINGS

Figure 1:
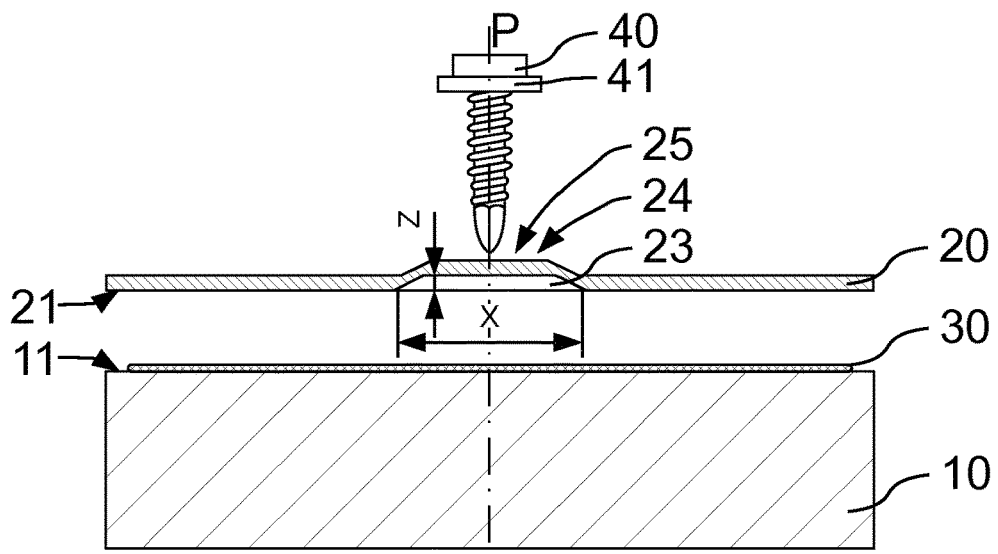
FIG. 1 shows a first step of a method for producing a composite component.
Figure 2:
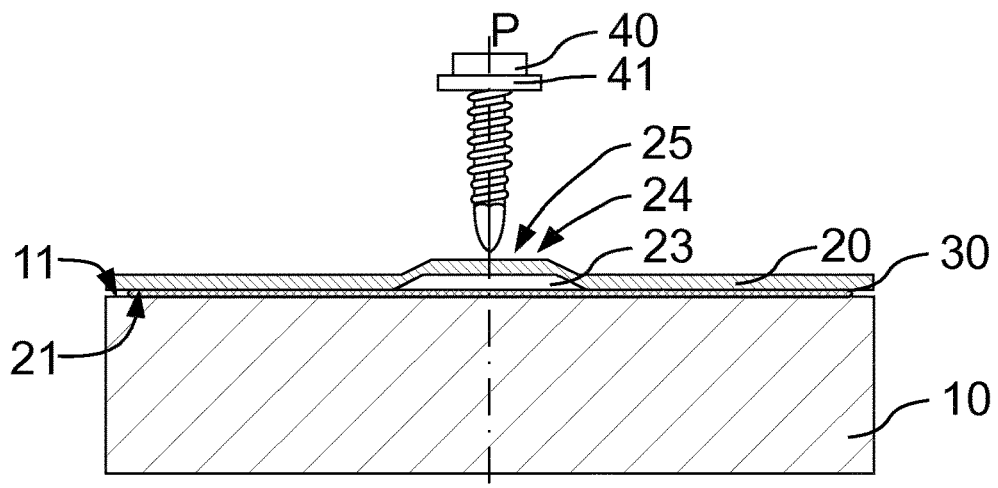
FIG. 2 shows a second step of the method for producing the composite component.

FIG. 1 shows a first step of the production method. What is shown is the first joining element 10 to which the adhesive 30 is applied. The adhesive 30 is arranged on the joining surface 11 of the first joining element. The second joining element 20, formed as a metal sheet, has a pot-shaped formation 24 which is produced in a pressing plant by way of a deep-drawing method. The pot-shaped formation protrudes from the plane of the second joining element 20, pointing away from the first joining element 10, and defines a recess 23 on the joining surface 21 of the second joining element 20. The recess faces toward the first joining element 10. The flow drill screw 40 is arranged in the screw position P, centered above the pot-shaped formation 24.

The recess 23 has a diameter X, which is measured at the joining surface 21 of the second joining element 20. The recess 23 also has a depth Z, which is measured from the joining surface 21 of the second joining element 20 to the deepest point of the recess.

By virtue of the bringing together or arranging of the second joining element 20 on the first joining element 10, the second joining element 20 comes into contact with the adhesive 30, said adhesive having not yet been cured and being viscous. The flow drill screw 40 is then screwed, in the screw position P, through the second joining element 20 into the first joining element 10. The flow drill screw 40, by way of its rotation, at its tip, first heats the second joining element, as a result of which the heated material of the second joining element becomes viscous and is displaced by the advance of the flow drill screw 40. The heated material is partially pressed onto that surface of the second joining element 20 which faces away from the first joining element 10, and is partially pressed into the cavity, which is determined by the recess 23 and in which it forms a bead-shaped ejection 22 made of material of the second joining element 20. By virtue of the advance, the flow drill screw 40 is pressed further toward the first joining element 10, forms a thread in the second joining element 20 and heats the first joining element 10 until the heated material of the first joining element 10 liquefies or becomes viscous and is transported into the cavity which is determined by the recess 23, in that it solidifies in the form of a bead-shaped ejection 12 made of material of the first joining element 10.

Figure 3:
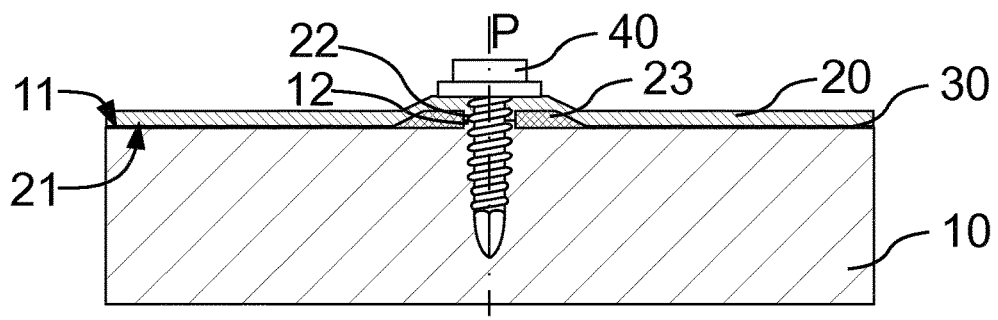
FIG. 3 shows a third step of the method for producing the composite component.

FIG. 3 shows the second joining element 20 joined to the first joining element 10, the flow drill screw 40 having in each case formed a hole in the first and second joining element 10, 20 and cut in a thread. The material displaced in the process from the respective joining element has been conveyed in each case into the cavity, which is determined by the recess 23, and solidified there in the form of a bead-shaped ejection 12, 22. By virtue of the fact that the recess 23 has created a cavity that is large enough to accommodate all of the displaced material, an uncontrolled gap has not formed between the first and second joining element 10, 20. As a result of the pressing of the second joining element 20 onto the first joining element 10, the adhesive 30 has been distributed areally between the two joining elements and conveyed into the recess 23, such that the adhesive, after a curing time, produces a durable adhesive connection between the joining elements. The screw head 41 of the flow drill screw 40 rests flatly on the supporting surface 25 of the pot-shaped formation 24, such that the forces can be diverted by the screw in a uniform manner and over a large area on the joining elements.

Figure 4:
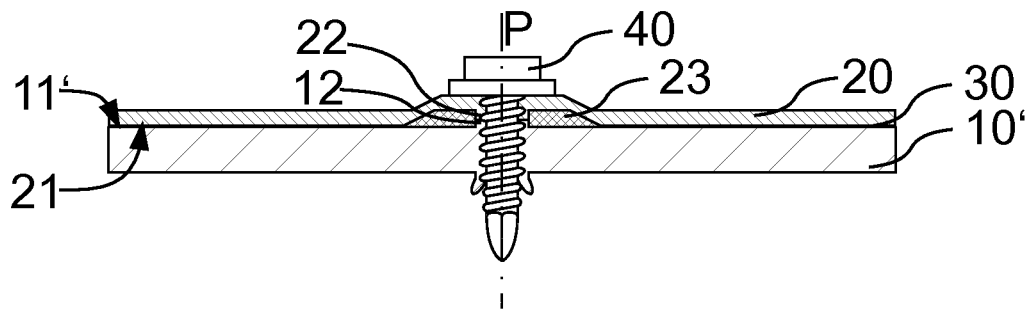
FIG. 4 shows a third step of the method for producing an alternative composite component.

FIG. 4 shows a third step of the method for producing an alternative composite component. In the case of the composite component illustrated, the first joining element 10' is likewise a metal sheet. The flow drill screw 40 penetrates the metal sheet and conveys part of the heated and displaced material onto the surface which faces away from the second joining element 20 and at which the material solidifies in the form of a further bead-shaped ejection. However, part of the material is furthermore conveyed into the cavity which is determined by the recess 23.

Figure 5:
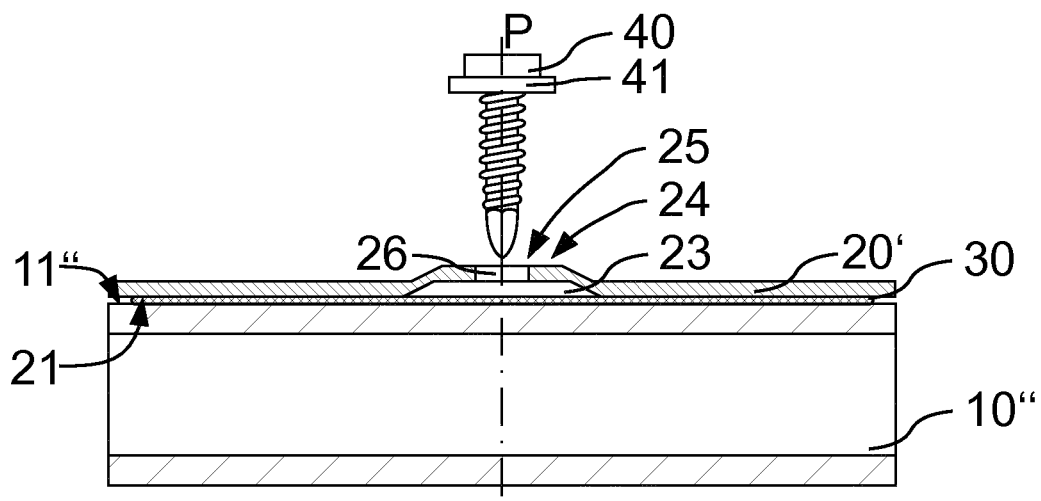
FIG. 5 shows a second step of the method for producing an alternative composite component.

In the case of the composite component illustrated in FIG. 5, the second joining element 20' already has a through-hole 26 prior to the fixing operation. By way of the through-hole 26, which is formed already prior to the fixing of the second joining element 20' on the first joining element 10'', during the fixing operation, less material is conveyed into the cavity which is determined by the recess 23, such that the cavity has to accommodate a relatively small volume and can therefore be configured to be smaller. The first joining element 10'' illustrated is also a hollow profile, such that the displaced material of the first joining element 10'' is at least partially conveyed into the interior of the hollow profile, where it solidifies.

Figure 6:
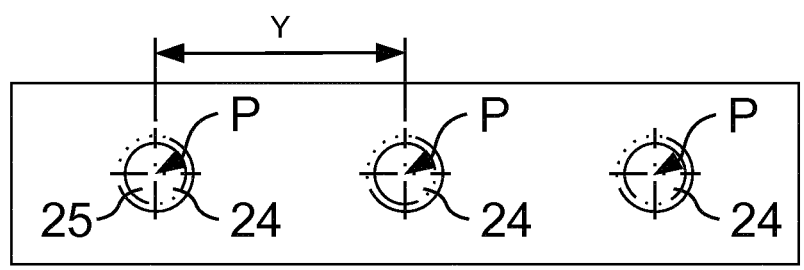
FIG. 6 shows a plan view of a second joining element for producing a composite component according to the invention.

FIG. 6 illustrates a plan view of a second joining element 20. Three pot-shaped formations 24 are visible, which each form a flat supporting surface 25 for a flow drill screw 40. The pot-shaped formations 24 are each arranged centered around a screw position P, which are in each case spaced apart from the respectively directly adjacent screw position by the spacing Y. The spacing apart of the screw position and thus of the pot-shaped formations 24 creates a sufficiently large region between the pot-shaped formations 24, in which the adhesive action of the adhesive 30 can take effect.

The embodiment of the invention is not limited to the preferred exemplary embodiments indicated above. Rather, a number of variants are conceivable which make use of the presented solution even in the case of fundamentally different embodiments. By way of example, instead of a flow drill screw, use could be made of a different connecting element, which is connected to the first joining element by means of a friction welding method and bears and rests on the second joining element, pressing the second joining element against the first joining element, or is connected to the second joining element by way of the friction welding method.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a composite component composed of a first joining element and a second joining element, the method comprising the steps of:
   a. applying an adhesive to a joining surface of the first joining element;
   b. arranging a joining surface of the second joining element on the joining surface of the first joining element;
   c. fixing the second joining element on the first joining element by screwing in a respective flow drill screw at at least one screw position on the second joining element, the respective flow drill screw being screwed through the second joining element into the first joining element, with simultaneous flow drill screwing of a hole and a thread for the respective flow drill screw into the first joining element, wherein
   prior to fixing the second joining element on the first joining element, in the joining surface of the second joining element, forming a recess around the at least one screw position, at which the respective flow drill screw penetrates the second joining element,
   the at least one screw position on the second joining element comprises two or more screw positions each with a respective recess and wherein the recesses of two directly adjacent screw positions are connected to one another and form a channel-shaped cavity in the second joining element toward the first joining element.

2. The method according to claim 1, wherein the second joining element is a metal sheet.

3. The method according to claim 2, wherein the metal sheet is an aluminum metal sheet.

4. The method according to claim 2, wherein
   the recess in the metal sheet is produced by way of a non-cutting forming method such that the metal sheet forms the recess by way of a pot-shaped formation, a cavity of which points toward the first joining element.

5. The method according to claim 4, wherein
   the non-cutting forming method is a stamping or deep-drawing method.

6. The method according to claim 4, wherein
   the pot-shaped formation on a surface of the second joining element that faces away from the first joining element forms a supporting surface for a screw head of the respective flow drill screw, said supporting surface having a supporting-surface diameter which is at least the same size as a diameter of the respective screw head.

7. The method according to claim 1, wherein
   the second joining element, at the at least one screw position, has a respective through-hole, or has such a through-hole introduced, through which the flow drill screw is screwed into the first joining element during the fixing of the second joining element on the first joining element.

8. The method according to claim 1, wherein
   the recess is of round configuration and is arranged centered around the respective screw position.

9. The method according to claim 8, wherein
   the recess has a diameter of between 10 and 30 mm, measured at the joining surface of the second joining element.

10. The method according to claim 9, wherein
the recess has a depth of between 0.5 and 2 mm, measured from the joining surface of the second joining element to the deepest point of the recess.

11. The method according to claim 1, wherein
the recess has a depth of between 0.5 and 2 mm, measured from the joining surface of the second joining element to the deepest point of the recess.

12. The method according to claim 9, wherein
two screw positions have a spacing from one another of between 40 and 100 mm.

13. The method according to claim 1, wherein
two screw positions have a spacing from one another of between 40 and 100 mm.

* * * * *